United States Patent
Keret et al.

(10) Patent No.: US 11,062,712 B2
(45) Date of Patent: *Jul. 13, 2021

(54) SEAMLESS TEXT DEPENDENT ENROLLMENT

(71) Applicant: Nice Ltd., Ra'anana (IL)

(72) Inventors: Matan Keret, Oulu (FI); Omer Kochba, Hod Hasharon (IL); Amnon Buzaglo, Karkur (IL)

(73) Assignee: NICE LTD., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/785,158

(22) Filed: Feb. 7, 2020

(65) Prior Publication Data

US 2020/0175994 A1  Jun. 4, 2020

Related U.S. Application Data

(63) Continuation of application No. 16/255,644, filed on Jan. 23, 2019, now Pat. No. 10,600,423, which is a continuation of application No. 15/660,452, filed on Jul. 26, 2017, now Pat. No. 10,255,923.

(51) Int. Cl.
  *G10L 17/24* (2013.01)
  *G10L 17/06* (2013.01)
  *G10L 17/04* (2013.01)

(52) U.S. Cl.
  CPC .............. *G10L 17/24* (2013.01); *G10L 17/04* (2013.01); *G10L 17/06* (2013.01)

(58) Field of Classification Search
  CPC .......... G10L 17/24; G10L 17/04; G10L 17/06

USPC ......................................................... 704/249
See application file for complete search history.

(56) References Cited

U.S. PATENT DOCUMENTS

| 6,219,639 | B1 |   | 4/2001  | Bakis et al. |
|-----------|-----|---|---------|------|
| 8,442,824 | B2 | * | 5/2013  | Aley-Raz ................ G10L 17/24 704/247 |
| 8,874,442 | B2 | * | 10/2014 | Aley-Raz ................ G10L 17/24 704/247 |
| 9,484,037 | B2 | * | 11/2016 | Aley-Raz ................ G10L 17/04 |
| 9,620,123 | B2 |   | 4/2017  | Faians et al. |
| 9,721,571 | B2 | * | 8/2017  | Lousky .................. G10L 17/04 |
| 10,083,693 | B2 | * | 9/2018 | Jaiswal .............. H04M 3/4936 |
| 10,249,304 | B2 | * | 4/2019 | Jaiswal ............. H04M 3/42221 |
| 10,255,923 | B2 | * | 4/2019 | Keret ...................... G10L 17/06 |
| 10,592,649 | B2 | * | 3/2020 | Keret ...................... G10L 17/24 |
| 10,600,423 | B2 | * | 3/2020 | Keret ...................... G10L 17/04 |
| 2016/0365095 | A1 |   | 12/2016 | Lousky et al. |
| 2017/0194004 | A1 |   | 7/2017 | Lousky et al. |

* cited by examiner

*Primary Examiner* — Susan I McFadden
(74) *Attorney, Agent, or Firm* — Pearl Cohen Zedek Latzer Baratz LLP

(57) ABSTRACT

Methods and systems for transforming a text-independent enrollment of a customer in a self-service system into a text-dependent enrollment are provided. A request for authentication of a customer that is enrolled in the self-service system with a text-independent voice print is received. A request is transmitted to the customer to repeat a passphrase and the customer's response is received as an audio stream of the passphrase. The customer is authenticated by comparing the audio stream of the passphrase against the text-independent voice print and if the customer is authenticated then a text-dependent voice print is created based on the passphrase, otherwise discard the audio stream of the passphrase.

14 Claims, 4 Drawing Sheets

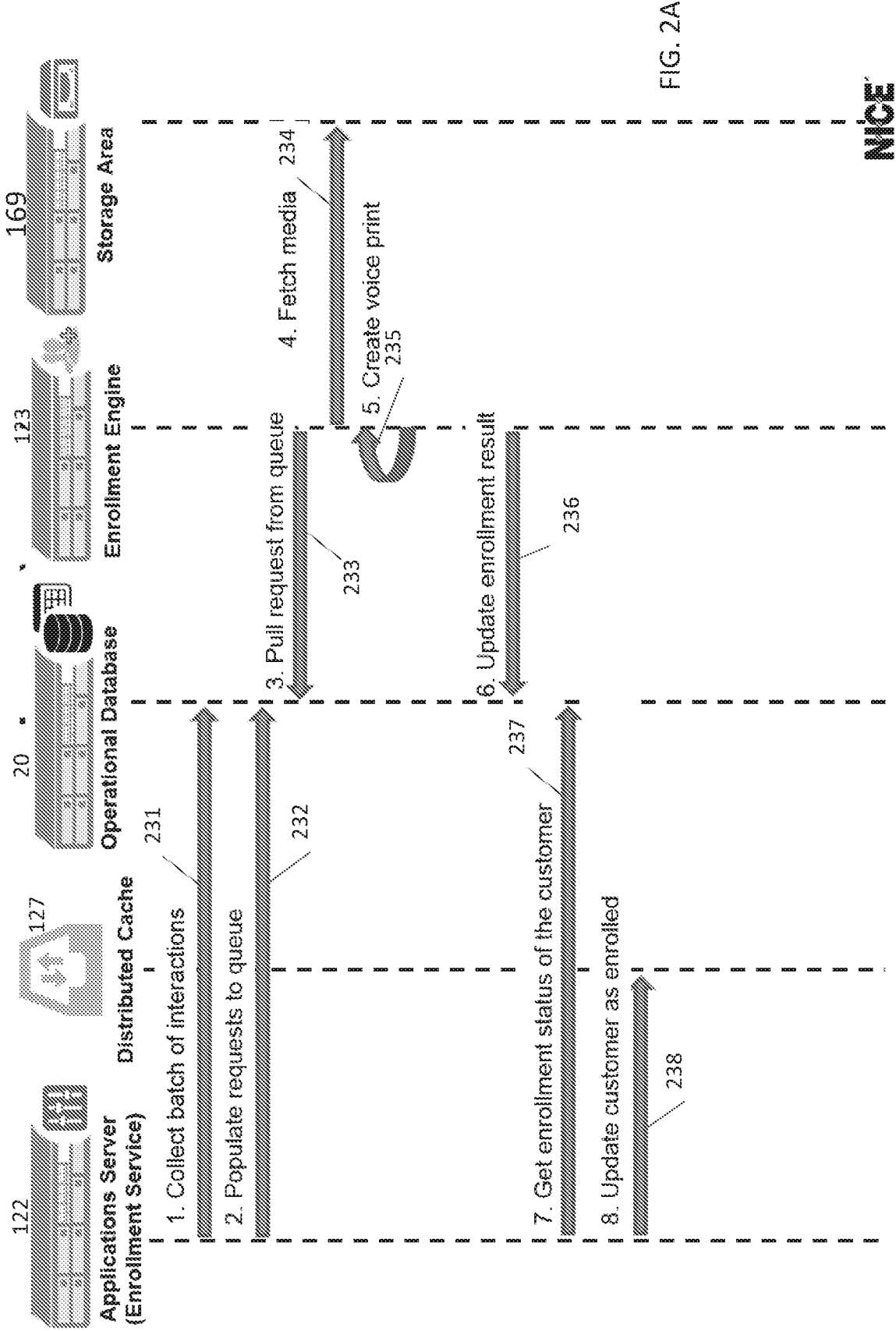

SEAMLESS TEXT DEPENDENT ENROLLMENT

RELATED APPLICATION DATA

The present application is a continuation of prior U.S. application Ser. No. 16/255,644, filed Jan. 23, 2019, and entitled "SEAMLESS TEXT DEPENDENT ENROLLMENT", which is in turn a continuation of prior U.S. application Ser. No. 15/660,452, filed Jul. 26, 2017, entitled "SEAMLESS TEXT DEPENDENT ENROLLMENT", each of which being incorporated by reference herein in its entirety.

FIELD OF THE INVENTION

The invention relates generally to the field of authentication of individuals. In particular, the invention relates to the authentication of individuals using their voices.

BACKGROUND OF THE INVENTION

Large organizations, such as commercial organizations, financial institutions, government agencies or public safety organizations conduct numerous interactions (i.e., communication sessions) with customers, users, suppliers and the like on a daily basis. Many of these interactions are vocal or at least comprise a vocal or audio component, for example, voices of parties to a telephone call or the audio portion of a video or a face-to-face interaction. A significant part of these interactions takes place between a customer and a representative of the organization, e.g., an agent in a contact center.

Communication sessions can involve exchanging sensitive information, for example, financial data, transactions and personal medical data, thus the agent is required to authenticate the identity of the customer, before offering the customer any assistance or services. When a communication session begins the system or an agent first identifies the customer, for example based on the customer's name, telephone number, ID number, Social Security number or Postal Index Number (PIN) code and later authenticates the identity of the customer. Traditional systems and methods use knowledge-based information also known as, Know Your Client (KYC) information, such as personal information known only to the client that was previously stored in the organization database (e.g., the name of your pet, your old school, the marriage data of your parents, etc). Some organizations use secret pass key(s) or even physical characteristics of the person, for example, finger prints and voice prints to authenticate the customer identity.

Voice prints or voice biometric data also known as spectrograms, spectral waterfalls, sonograms, or voicegrams, are time-varying spectral representations of sounds or voices. Digital voice prints can be created from any digital audio recording of voices, for example, audio recordings of communications sessions between agents and customers. A voice print can be generated by applying short-time Fourier transform (STFT) on various (preferably overlapping) audio streams of the audio recording (segment). A three-dimensional image of the voice print can present measurements of magnitude versus frequency for a specific moment in time. A speaker's voice is extremely difficult to forge for biometric comparison purposes, since a myriad of qualities are measured ranging from dialect and speaking style to pitch, spectral magnitudes, and format frequencies. The vibration of a user's vocal chords and the patterns created by the physical components resulting in human speech are as distinctive as fingerprints. Voice prints of two individuals can differ from each other at about one hundred (100) different points.

Enrolling a user's voice prints can require a text-dependent enrollment (e.g., capturing a particular passphrase recited by a user). Some systems can require that a user repeat a particular passphrase multiple times (e.g., 3-5 times). For example, a system can prompt a user as follows: 1) please enter your ID followed by #; 2) please enter your PIN followed by #; 3) to enroll, please say "I like using voice biometrics"; 4) please say again "I like using voice biometrics"; and 5) please say again "I like using voice biometrics". This can cause low user enrollment because many users do not want to actively enroll.

Some systems can enroll a user's voice print via a text-independent process (e.g., capturing voice utterance(s) of the user that aren't a particular passphrase). For example, a user can say the reason for their call (e.g., "I would like to set up an account"). The system can capture the user's utterance and use that utterance for the enrollment of the user's voice print. While text-independent enrollment of voice prints can be less burdensome for the user, identifying the user with the voice print created with text-independent enrollment can be less accurate than text-dependent enrollment.

Therefore, it can be desirable to maintain accuracy of text-dependent enrollment and reduced complexity of the text-independent enrollment.

SUMMARY OF THE INVENTION

One advantage of the invention includes text-dependent voice print enrollment without requiring a customer to say a repeated passphrase during a enrollment session. Another advantage of the invention includes passive enrollment of a customer with increased accuracy in voice identification.

In one aspect, the invention involves a computer-implemented method for transforming a text-independent enrollment of a customer in a self-service system into a text-dependent enrollment. The method involves receiving a request for authentication of the customer, the customer is then enrolled in the self-service system with a text-independent voice print. The method also involves transmitting a request to the customer to repeat a passphrase and receiving an audio stream of the passphrase. The method also involves authenticating the customer by comparing the audio stream of the passphrase against the text-independent voice print and if the customer is authenticated then creating a text-dependent voice print based on the passphrase, otherwise discard the audio stream of the passphrase.

In some embodiments, the computer-implemented method further involves upon receipt of a subsequent request for authentication of the customer, transmitting a request to the customer to repeat the passphrase, receiving another audio stream of the passphrase, and authenticating the customer by comparing the another audio stream of the passphrase with the text-dependent voice print.

In some embodiments, the computer-implemented method involves authenticating the customer by comparing the another audio stream of the passphrase with the text-dependent voice print further comprising transmitting the another audio stream of the passphrase and an indicator of whether to use text-dependent or text-independent comparison to a voice biometrics engine.

In some embodiments, creating the text-dependent voice print involves storing the audio stream of the passphrase and subsequently, after the customer is no longer using the self-service system, creating the text-dependent voice print. In some embodiments, the computer-implemented method involves storing the text-dependent voice print for the customer.

In another aspect, the invention involves an apparatus including a processor configured to receive a request for authentication of the customer, the customer is enrolled in the self-service system with a text-independent voice print, transmit a request to the customer to repeat a passphrase, receive an audio stream of the passphrase, authenticate the customer by comparing the audio stream of the passphrase against the text-independent voice print, and if the customer is authenticated then create a text-dependent voice print based on the passphrase, otherwise discard the audio stream of the passphrase.

In some embodiments, the processor is further configured to upon receipt of a subsequent request for authentication of the customer, transmit a request to the customer to repeat the passphrase, receive another audio stream of the passphrase, and authenticate the customer by comparing the another audio stream of the passphrase with the text-dependent voice print.

In some embodiments, authenticating the customer by comparing the another audio stream of the passphrase with the text-dependent voice print further comprises transmitting the another audio stream of the passphrase and an indicator of whether to use text-dependent or text-independent comparison to a voice biometrics engine.

In some embodiments, creating the text-dependent voice print further comprises storing the audio stream of the passphrase and subsequently, after the customer is no longer using the self-service system, creating the text-dependent voice print.

In some embodiments, the processor is further configured to store the text-dependent voice print for the customer.

In another aspect, the invention involves an article comprising a non-transitory computer-readable storage medium, having instructions stored thereon that when executed by a processor, cause the processor to receive a request for authentication of the customer, the customer is enrolled in the self-service system with a text-independent voice print, transmit a request to the customer to repeat a passphrase, receive an audio stream of the passphrase, authenticate the customer by comparing the audio stream of the passphrase against the text-independent voice print, and if the customer is authenticated then create a text-dependent voice print based on the passphrase, otherwise discard the audio stream of the passphrase.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, can best be understood by reference to the following detailed description when read with the accompanying drawings in which:

FIGS. 2A and 2B are sequence diagrams for transforming a text-independent enrollment of a customer in a self-service system into a text-dependent enrollment according to some embodiments of the present invention.

Figure 1:
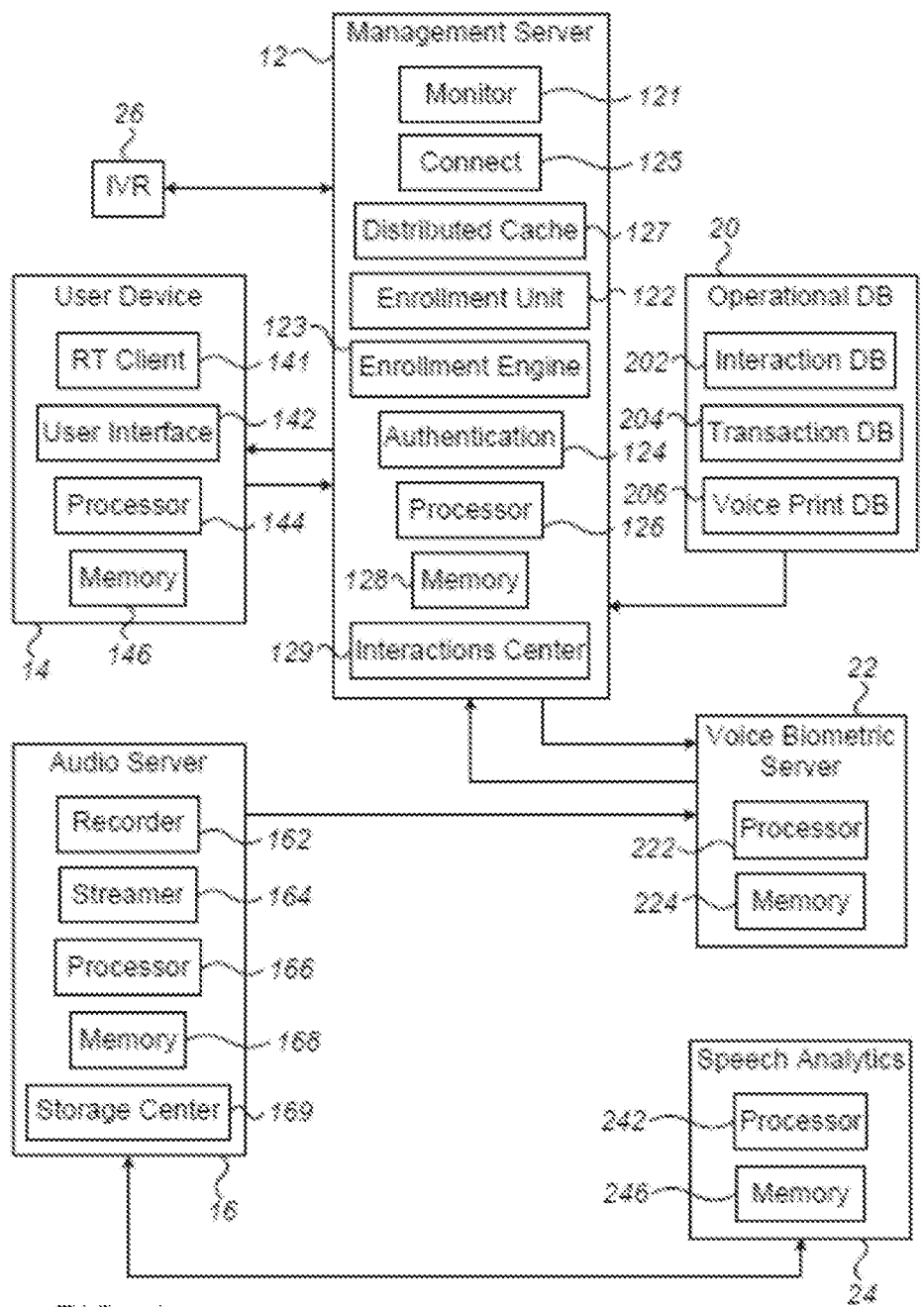
FIG. 1 is a high level block diagram of a system for authenticating and enrolling customers according to some embodiments of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element. Further, where considered appropriate, reference numerals can be repeated among the figures to indicate corresponding or analogous elements.

DETAILED DESCRIPTION OF EMBODIMENTS
OF THE INVENTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Although some embodiments of the invention are not limited in this regard, unless specifically stated otherwise, as apparent from the following discussions, it is appreciated that discussions utilizing terms such as, for example, "processing," "computing," "calculating," "determining," "establishing", "analyzing", "checking", "receiving", "selecting", "sending a request", "comparing", "enrolling", "reporting", "prompting", "storing" or the like, refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although some embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

In general, systems and methods are provided for enrolling user's (e.g., customer's) via voice prints. Some goods and services are promoted via fully automated channels, for example using IVR units possibly with the customers using mobile devices, involving little or no human intervention on the part of the party offering the goods or services. These fully automated channels can be referred to as "self-service" channels. Self-service channels can be popular with providers because of, for example, a limited requirement for human intervention, sometimes leading to cost reduction. Voice prints can be used to authenticate customers for such goods or services, in which case a voice print for the customer needs to be generated.

In general, a customer can be enrolled using a text-independent voice print obtained from the customer. For example, a customer can call in to a service provider and verbally request a service by speaking an utterance. The utterance can be captured and used to create a text-independent voice print of the customer, and the customer can be enrolled with a voice print without requesting the user utter a particular phrase.

The next time the same customer calls the service provider, the service provider can prompt the customer to utter a particular passphrase. The customer can utter the passphrase, and that utterance can be compared against the previously captured text-independent voice print, e.g., via a voice analytic biometric server, to authenticate the customer. If the customer is authenticated, the passphrase utterance by the customer can be used to create a text-dependent voice print. In this manner, a text-dependent voice print can be created for the customer without requiring the customer to recite a particular passphrase multiple times during their initial enrollment. In some embodiments, each time the customer calls the service provider and utters a prompted passphrase, the voice print of the customer is updated.

At least some of the components of the system illustrated in FIG. 1 can for example be implemented in a call center environment. As used herein "call center", otherwise known as a "contact center" can include any platform that enables two or more parties to conduct a communication session. For example, a call center can include one or more user devices that can be operated by human agents or one or more IVR units, either of which can be used to conduct a communication session with an individual.

The system can include a plurality of user devices 14 (only one is shown) that can for example be operated by agents of a call center during, before and after engaging in a communication session with an individual, one or more audio servers 16 (only one is shown) to record communication sessions, a management server 12 configured to control the enrollment and/or authentication processes, an operational database 20 that includes data related to individuals and communication sessions, a voice biometric server 22 configured to generate voice prints of the individuals, a speech analytics server 24, and an IVR unit 26.

According to some embodiments of the invention, the speech analytics server can be configured to analyze recordings of speech by an individual; and the voice biometric server can generate a voice print for the individual based on the analyzed utterances.

It should be noted that the various servers shown in FIG. 1 can be implemented on a single computing device according to embodiments of the invention. Equally, the functions of any of the servers can be distributed across multiple computing devices. In particular, the speech analytics and voice biometrics functions need not be performed on servers. For example, they can be performed in suitably programmed processors or processing modules within any computing device.

Management server 12 can receive information from any of user device 14, from IVR unit 26, from operational database 20 and from voice biometric server 22. Voice biometric server 22 can generate voice prints from audio streams received from audio server 16. Any of audio server 16, IVR unit 26 and user device 14 can be included in a call center or contact center for conducting and recording communication sessions. According to some embodiments of the invention, management server 12 can serve the function of an applications server.

During a communication session, management server 12 can receive from user device 14 or IVR unit 26 a request to authenticate an individual. After performing the authentication and while the communication session still proceeds, management server 12 can send a notification to the user device or the IVR unit 26, confirming whether or not the individual was successfully authenticated. Further, according to some embodiments of the invention, management server 12 can perform passive (seamless) authentication of individuals and control enrollment of voice prints.

Management server 12 can include an enrollment unit 122, which can also be referred to as an enrollment server, configured to control the enrollment process of new voice prints according to enrollment logic. Management server 12 can further include an enrollment engine 123 which can comprise a module responsible for managing (e.g. collecting and dispatching) enrollment requests and "feeding" the enrollment unit. Management server 12 can further include an authentication unit 124, which can also be referred to as an authentication server or an authentication manager, to control automatic and seamless authentication of the individual during the communication session.

Management server 12 can further include at least one processor 126 and at least one memory unit 128. Processor 126 can be any computer, processor or controller configured to execute commands included in a software program, for example to execute the methods disclosed herein. Enrollment manager 122 and authentication server 124 can each include or can each be in communication with processor 126. Alternatively, a single processor 126 can perform both the authentication and enrollment methods. Processor 126 can include components such as, but not limited to, one or more central processing units (CPU) or any other suitable multi-purpose or specific processors or controllers, one or more input units, one or more output units, one or more memory units, and one or more storage units. Processor 126 can additionally include other suitable hardware components and/or software components.

Memory 128 can store codes to be executed by processor 126. Memory 128 can be in communication with or can be included in processor 126. Memory 128 can include a mass storage device, for example an optical storage device such as a CD, a DVD, or a laser disk; a magnetic storage device such as a tape, a hard disk, Storage Area Network (SAN), a Network Attached Storage (NAS), or others.

According to some embodiments of the invention, management server 12 can also include monitor 121 which can listen for events and/or dispatch events to other components of the system subscribing to monitor 121, such as a client operating on a user device 14 or in IVR unit 26.

According to some embodiments of the invention, management server can additionally include a connect module 125 including a distributed cache 127, which in some embodiments can be part of memory 128. The connect module 125 can connect real time (RT) clients operating on user devices such as user device 14 or IVR unit 26 with backend components of the system such as the operational database 20 and the voice biometric server 22. The distributed cache 127 can comprise an in-memory database, used for fast data fetching in response to queries, e.g. from a user device 14 or IVR unit 26.

According to some embodiments of the invention, management server can additionally include an interaction center 129. The functions of the interaction center 129 can include managing the recording of interactions. For example the interactions center can be a module that, for example during a telephone call, interacts with the telephony switch or packet branch exchange (PBX, not shown in FIG. 1) and computer telephony integration (CTI, not shown in FIG. 1) of an individual communicating with the user of a user device 14 to obtain start and/or end of call events, metadata and audio streaming. The interaction center 129 can extract events from a call sequence and translate or convert them for storage, indexing and possibly other operations in a backend system such as operational database 20.

User device 14 can for example be operated by an agent within a contact center. For example, user device 14 can include a desktop or laptop computer in communication with the management server 12 for example via any kind of communications network. User device 14 can include a user interface 142, a processor 144 and a memory 146. User interface 142 can include any device that allows a human user to communicate with the processor. User interface 142 can include a display, a Graphical User Interface (GUI), a mouse, a keyboard, a microphone, an earphone and other devices that can allow the user to upload information to processor 144 and receive information from processor 144. Processor 144 can include or can be in communication with memory 146 that can include codes or instructions to be executed by processor 144.

According to some embodiments of the invention, user device 14 can further include a real time client 141 which can take the form of client software running on a desktop for example associated with an agent at user device 14. The real time client 141 can be configured to "listen" to events and extract information from applications running on the desktop. Examples of such events can include but are not limited to:
 the start of a communication session with an individual
 the resolving of an individual, e.g. the retrieval of information from the operational database purporting to identify the individual
 the commencement of an utterance by the individual of a predetermined phrase
 the end of the utterance of the predetermined phrase.

Similarly, in some communication sessions, the IVR unit 26 can perform some of the functions of user device 14 and therefore the IVR unit can also include a real time client performing the same functions as the real time client 141.

During a communication session, user device 14 or IVR unit 26 can receive identification information from an individual, for example, the name of the individual, a customer number associated with the individual, an ID number and/or a social security number. Additionally or alternatively, device 14 or IVR unit 26 can receive identification information related to the individual automatically from details related to the "call", for example, the telephone number from which the individual calls, or the area (PIN code) from which the individual calls. An operator of user device 14 can use user interface 144 to upload and receive information related to the identity of the individual from database 20 via management server 12. Similarly an IVR unit can retrieve such information. The individual can be asked so called know your customer "KYC" questions related to data stored in database 20. For example, the individual can be asked to provide personal details (e.g., credit card number, and/or the name of his pet) or to describe the latest actions performed (e.g., financial transactions). During the communication session, an audio segment or an audio stream can be recorded and stored in audio server 16.

Audio server 16 can include an audio recorder 162 to record the individual's voice, an audio streamer 164 to stream the recorded voice, a processor 166 to control the recording, streaming and storing of the audio stream, and a memory 168 to store code to be executed by the processor. Audio recorder 162 can include any components configured to record an audio segment (a voice of an individual) of the communication session. Processor 166 can instruct audio streamer 164 to receive audio segment from recorder 162 and stream the segment into audio streams or buffers. Audio server 16 can further include, or can be in communication with, any storage unit(s) for storing the audio stream, e.g., in an audio archives. The audio archives can include audio data (e.g., audio streams) of historical communication sessions.

Audio server 16 can, according to some embodiments of the invention, include storage center 169 configured to store historical and ongoing speech and calls of individuals, for example but not limited to calls between individuals and IVR unit 26.

Operational database 20 can include one or more databases, for example, at least one of an interaction database 202, a transaction database 204 and a voice print database 206. Interaction database 202 can store non-transactional information of individuals, such as home address, name, and work history related to individuals such as customers of a company on whose behalf a call center is operating. Voice prints for individuals can also be stored in the interaction database 202 or in a separate voice print database 206. Such non-transactional information can be provided by an individual, e.g., when opening a bank account. Furthermore, database 202 can store interaction information related to previous communication sessions conducted with the individual, such as but not limited to the time and date of the session, the duration of the session, information acquired from the individual during the session (e.g., authentication information, successful/unsuccessful authentication). Applications used in a system according to some embodiments of the invention can also be stored in operational database 20.

Transaction database 204 can include transactional information related to previous actions performed by the individual, such as actions performed by the individual (e.g., money transfer, account balance check, order checks books, order goods and services or get medical information). Each of databases 202 and 204 can include one or more storage units. In an exemplary embodiment, interaction database 202 can include data related to the technical aspects of the communication sessions (e.g., the time, date and duration of the session), a Customer relation management (CRM) database that stores personal details related to individuals or both. In some embodiments, interaction database 202 and transaction database 204 can be included in a single database. Databases 202 and 204 included in operational database 20 can include one or more mass storage devices. The storage device can be located onsite where the audio segments or some of them are captured, or in a remote location. The capturing or the storage components can serve one or more sites of a multi-site organization.

Audio or voice recordings recorded, streamed and stored in audio server 16 can be processed by voice biometric server 22. Voice biometric server 22 can include one or more processors 222 and one or more memories 224. Processor 222 can include or can control any voice biometric engine known in the art, for example, the voice biometric engine by Nice Ltd. to generate a voice print (e.g., voice biometric data) of at least one audio stream received from audio server 16. The voice print can include one or more parameters associated with the voice of the individual. Processor 222 can include or can control any platform known in the art, for example the platform by Nice Ltd, for processing (e.g., identifying and comparing) voice prints generated from two or more audio streams. When an audio stream associated with an individual is a candidate for enrollment, voice biometric server 22 can receive from management server 12 verification of the identity of the individual. Following the verification, voice biometric server 22 can generate a voice print of the audio stream related to the individual. Processor 222 can further be configured to compare the generated voice print to other voice prints previously enrolled and stored, for example, in one or more storage units associated with voice biometric server 22. The storage units associated with voice biometric server 22 can include voice prints stored at a potential fraudster list (i.e., watch list, black list, etc.), voice prints related to the individual that were enrolled following previous communication sessions with the individual, and/or voice prints related or associated with other individuals. Memory 224 can include codes or instructions to be executed by processor 222. In some embodiments, memories 146, 168 or 224 can include the same elements disclosed with respect to memory 128.

Speech analytics server 24, similarly to voice biometric server 22, can comprise one or more processors, such as processor 242 and memory 246.

Figure 2B:
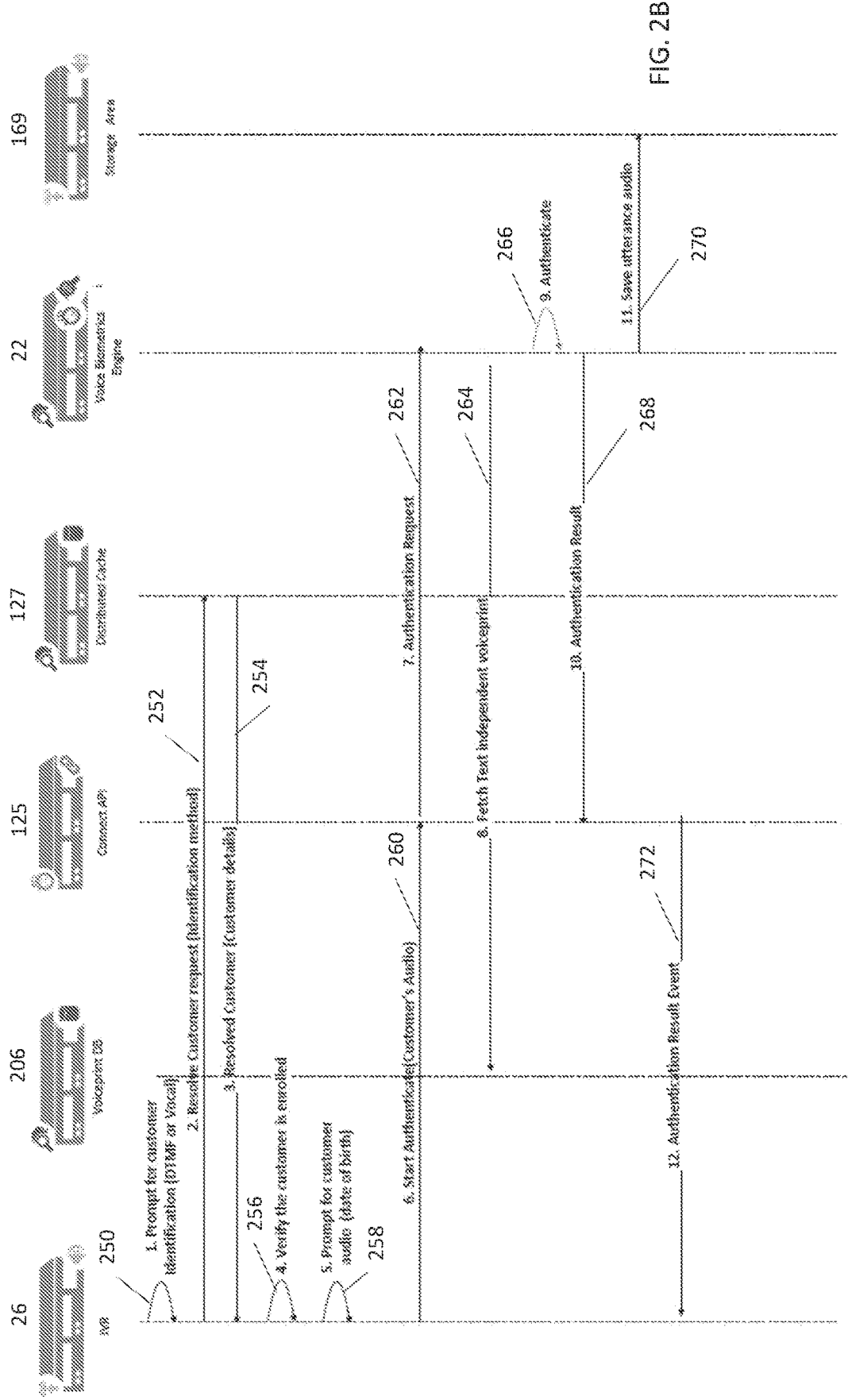

FIGS. 2A and 2B are sequence diagrams for transforming a text-independent enrollment of a customer in a self-service system into a text-dependent enrollment according to some embodiments of the present invention. These embodiments take the example of a customer calling a call center. Some embodiments of the invention may use a similar sequence of events for other kinds of individual participating in other kinds of communication session.

When a call or other voice interaction is initiated, the enrollment unit 122 can fetch a batch of recorded interactions 231 (e.g., a pre-defined number of recorded calls per customer that can be used to create a voice print). The batch of recorded interactions can be filtered according to one or more parameters (e.g., call duration, agent name/identification, level of authority of the agent and/or any other business data based filter) to, for example, add an addition layer of security.

The enrollment unit 122 can transmit a request for enrollment of a customer 232 to a queue of the operational database 20. The enrollment engine 123 can fetch the request for enrollment 233 from the operation database 20. The enrollment engine 123 can fetch media 234 (e.g., a recorded interaction) from the storage center 169. For example, the enrollment engine 123 can fetch one or more recordings of interactions for a customer identifier that is the same as the customer seeking enrollment.

The enrollment engine 123 creates a voice print 235. The enrollment engine can use a voice biometrics engine (e.g., voice biometrics server 22, as described above). The voice print is a text-independent voice print because it is based on audio recordings of the customer that are utterances of the customer made without being prompted with one or more passphrases.

The enrollment engine 123 transmits the enrollment results 236 to the operational database 20. The enrollment unit 122 fetches an enrollment status of the of the customer 237 from the operational database 20. The enrollment unit 122 transmits an update 238 to the distributed cache 127 indicating that the customer is enrolled.

When a subsequent call by the same customer or other voice interaction is initiated, the IVR 26 prompts the customer initiating the call or interaction with an identification request 250. The identification request can be a request for a vocal response or a request for a dual tone multi frequency (DTMF) response (e.g., the customer input is from touch keys).

The IVR 26 can transmit a request to resolve the customer's request 252 to the distributed cache 127 including the customer identifier. The distributed cache 127 can hold metadata related to the customer. The metadata can include an enrollment status, last successful authentication date and time, an internal identifier, or any combination thereof.

The distributed cache 127 can transmit a response to the request to resolve the customer's request 254 including the metadata to the IVR 26.

The IVR 26 can verify that the customer is enrolled 256 based on the metadata. The IVR 26 can prompt 258 the customer for a passphrase (e.g., date of birth). The prompt can be for other data items related to the customer. For example, the prompt can be address, city of birth, telephone number on file, or any other data item as is known in the art. The IVR 26 can record the customer's response to the prompt (e.g., an utterance of the customer recorded into an audio file).

The IVR 26 can transmit a request to start authentication 260 with the customer's audio response to the connect module 125. The connect module 125 can transmit an authentication request 262 to the voice biometrics server 22.

The voice biometrics server 22 can fetch a text-independent voice print of the customer 264 (e.g., a text-independent voice print passively created during an initial enrollment of the customer). The voice biometrics server 22 can authenticate 266 the customer by determining if the customer's audio response to the prompt is sufficiently matched to the text-independent voice print.

The voice biometrics server 22 can transmit the authentication results 268 to the connect module 125. If the customer is authenticated, the voice biometrics server 22 can create a text-dependent voice print for the customer from the customer's audio response, and transmit 270 the text-dependent voice print to the storage area 169 for saving. The voice print created by the voice biometrics server is a text-dependent voice print because the customer's audio response is a known/expected utterance of the customer. In this manner, a customer can be passively enrolled with a text-dependent voice print. In some embodiments, if a text-dependent voice print exists for the customer prior to the current interaction, then the existing text-dependent voice print of the customer is updated with the voice print for the current interaction.

The connect module 125 can transmit the authentication results 272 to the IVR 26.

Figure 3:
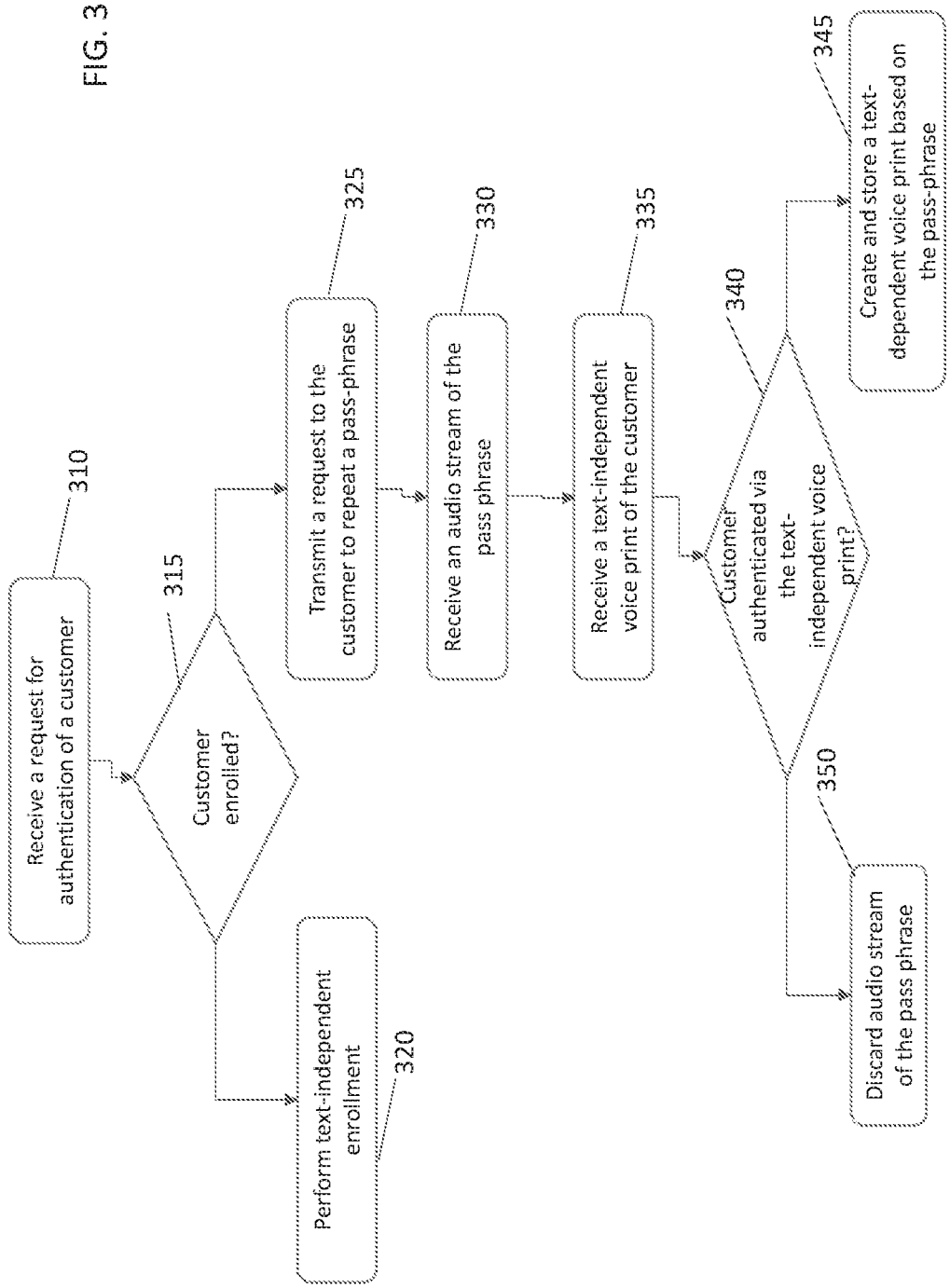
FIG. 3 is a flowchart of a method for transforming a text-independent enrollment of a customer in a self-service system into a text-dependent enrollment according to some embodiments of the present invention.

FIG. 3 is a flow chart for a method for transforming a text-independent enrollment of a customer in a self-service system into a text-dependent enrollment, according to some embodiments of the invention.

The method involves receiving a request for authentication of the customer (Step 310). The request can include one or more pieces of information that identify the customer. For example, the one or more pieces of information can include a customer identification, a device identifier, a phone number, an address of the customer, or any combination thereof.

The method can include determining whether the customer is enrolled in the self-service system with a text-independent voice print (Step 315). If the customer is not enrolled in the self-service system, then the method can involve performing a text-independent enrollment (Step 320) (e.g., as shown above in the sequence of FIG. 2a).

If the customer is enrolled in the self-service system, then the method can involve transmitting a request to the customer to repeat a passphrase (Step 325). The passphrase can be any phrase, as is known in the art.

The method can also involve receiving an audio stream of the passphrase (Step 330). The audio stream can be a recording of the customer uttering the passphrase. The method can also involve receiving a text-independent voice print of the customer (Step 335). In some embodiments, the text-independent voice print of the customer is retrieved from a memory.

The method can also involve authenticating the customer by comparing the audio stream of the passphrase against the text-independent voice print (Step 340). If the customer is authenticated, then the method can involve creating a text-dependent voice print based on the passphrase (Step 345). In some embodiments, the text-dependent voice print is created after the customer stops using the self-service system.

If the customer is not authenticated, then the method can involve discarding the audio stream of the passphrase (Step 350).

In some embodiments, upon subsequent calls by the same customer, even though the customer already has a text-independent and text-dependent voice print, the passphrase the customer recites is used to update and/or improve the text-dependent voice print. For example, if a duration threshold (e.g., 3 weeks, 3 months, or 1 year) has passed since the customer's last contact, then the text-dependent voice print can be completely replaced. In some embodiments, a text-dependent passphrase is updated by combining the current passphrase utterance of the customer (e.g., as is known in the art).

Different embodiments are disclosed herein. Features of certain embodiments can be combined with features of other embodiments; thus certain embodiments can be combinations of features of multiple embodiments.

Embodiments of the invention can include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A computer-implemented method for transforming a text-independent enrollment of a customer in a self-service system into a text-dependent enrollment, the method comprising:
   receiving a request for authentication of the customer, the customer is enrolled in the self-service system with a text-independent voice print;
   transmitting a request to the customer to repeat a passphrase;
   receiving an audio stream of the passphrase;
   authenticating the customer by comparing the audio stream of the passphrase against the text-independent voice print; and
   if the customer is authenticated then creating a text-dependent voice print based on the passphrase.

2. The computer-implemented method of claim 1 further comprising upon receipt of a subsequent request for authentication of the customer, transmitting a request to the customer to repeat the passphrase, receiving another audio stream of the passphrase, and authenticating the customer by comparing the another audio stream of the passphrase with the text-dependent voice print.

3. The computer-implemented method of claim 2 wherein authenticating the customer by comparing the another audio stream of the passphrase with the text-dependent voice print further comprising transmitting the another audio stream of the passphrase and an indicator of whether to use text-dependent or text-independent comparison to a voice biometrics engine.

4. The computer-implement method of claim 1 wherein creating the text-dependent voice print further comprises storing the audio stream of the passphrase and subsequently, after the customer is no longer using the self-service system, creating the text-dependent voice print.

5. The computer-implemented method of claim 1 further comprising storing the text-dependent voice print for the customer.

6. The computer-implemented method of claim 1 further comprising, if the customer is not authenticated, discarding the audio stream of the passphrase.

7. An apparatus comprising:
   a processor configured to:
   receive a request for authentication of the customer, the customer is enrolled in the self-service system with a text-independent voice print;
   transmit a request to the customer to repeat a passphrase;
   receive an audio stream of the passphrase;
   authenticate the customer by comparing the audio stream of the passphrase against the text-independent voice print; and
   if the customer is authenticated then create a text-dependent voice print based on the passphrase.

8. The apparatus of claim 7, wherein the processor is further configured to: upon receipt of a subsequent request for authentication of the customer, transmit a request to the customer to repeat the passphrase, receive another audio stream of the passphrase, and authenticate the customer by comparing the another audio stream of the passphrase with the text-dependent voice print.

9. The apparatus of claim 8, wherein authenticating the customer by comparing the another audio stream of the passphrase with the text-dependent voice print further comprises transmitting the another audio stream of the passphrase and an indicator of whether to use text-dependent or text-independent comparison to a voice biometrics engine.

10. The apparatus of claim 7, wherein creating the text-dependent voice print further comprises storing the audio stream of the passphrase and subsequently, after the customer is no longer using the self-service system, creating the text-dependent voice print.

11. The apparatus of claim 7, wherein the processor is further configured to: store the text-dependent voice print for the customer.

12. The apparatus of claim 7, wherein the processor is further configured to: if the customer is not authenticated, discard the audio stream of the passphrase.

13. An article comprising a non-transitory computer-readable storage medium, having instructions stored thereon that when executed by a processor, cause the processor to:

receive a request for authentication of the customer, the customer is enrolled in the self-service system with a text-independent voice print;
transmit a request to the customer to repeat a passphrase;
receive an audio stream of the passphrase;
authenticate the customer by comparing the audio stream of the passphrase against the text-independent voice print; and
if the customer is authenticated then create a text-dependent voice print based on the passphrase.

14. The article of claim 13 wherein the instructions when executed cause the processor to, if the customer is not authenticated, discard the audio stream of the passphrase.

* * * * *